United States Patent [19]

Enokimoto et al.

[11] 4,405,027
[45] Sep. 20, 1983

[54] MOTOR VEHICLE

[75] Inventors: Akito Enokimoto, Asaka; Toshio Tsuchiya, Kawagoe; Tatsuo Masuda, Niiza; Suwaji Takano, Urawa, all of Japan

[73] Assignee: Honda Giken Kogyo Kabushiki Kaisha, Tokyo, Japan

[21] Appl. No.: 311,467

[22] Filed: Oct. 14, 1981

Related U.S. Application Data

[63] Continuation of Ser. No. 84,175, Oct. 12, 1979, abandoned.

[30] Foreign Application Priority Data

Oct. 12, 1979 [JP] Japan .................. 54-125619

[51] Int. Cl.³ .............................................. B60K 5/12
[52] U.S. Cl. .................................. 180/56; 180/54 F; 180/62; 180/292; 180/312
[58] Field of Search ............... 180/54 E, 62, 56, 45 R, 180/292, 299, 75, 71, 73 TL, 89.1, 312, 215; 296/203, 204; 267/54 A, 54 B

[56] References Cited

U.S. PATENT DOCUMENTS

| 1,164,863 | 12/1915 | Potter et al. | 180/216 |
| 1,486,763 | 3/1924 | Joubert | 180/56 |
| 2,152,573 | 3/1939 | Turner | 180/71 |
| 2,159,327 | 5/1939 | Hendrick | 267/54 A |
| 2,393,623 | 1/1946 | Ehrenberg | 180/71 |
| 2,488,978 | 11/1949 | Julien et al. | 180/54 F |
| 3,115,206 | 12/1963 | Renner | 180/292 |
| 3,521,721 | 7/1970 | Porsche et al. | 180/54 F |

FOREIGN PATENT DOCUMENTS

| 2510709 | 9/1976 | Fed. Rep. of Germany | 180/216 |
| 2002481 | 10/1969 | France | 180/215 |
| 532921 | 2/1941 | United Kingdom | 180/215 |

Primary Examiner—David M. Mitchell
Attorney, Agent, or Firm—Irving M. Weiner; Pamela S. Burt; John L. Shortley

[57] ABSTRACT

A motor vehicle which includes at least two rear wheels, wherein two leaf springs extend rearwardly from both sides of the frame of the vehicle, below the driver's seat, for supporting the axles of the rear wheels, respectively. An engine is interposed between the leaf springs.

7 Claims, 9 Drawing Figures

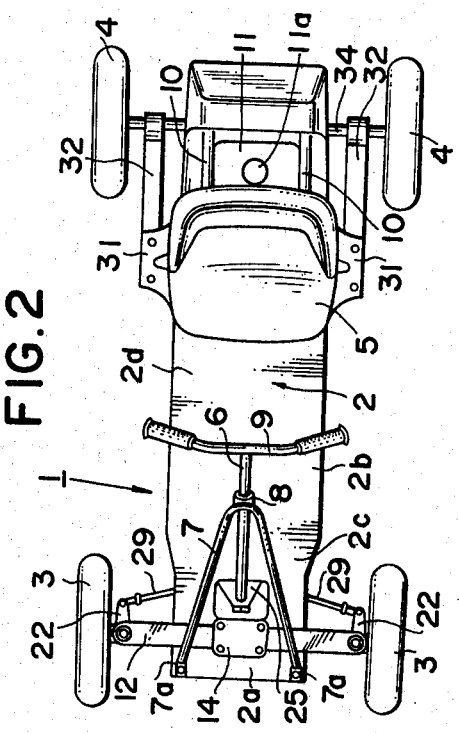
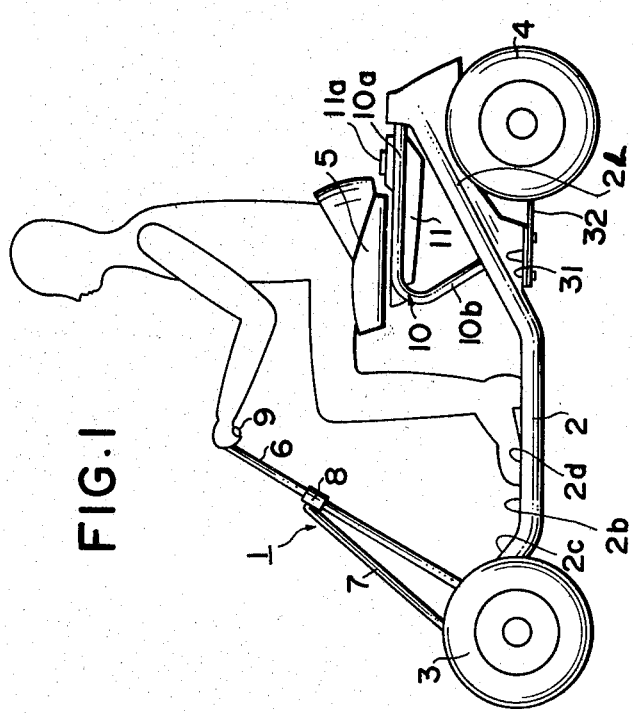
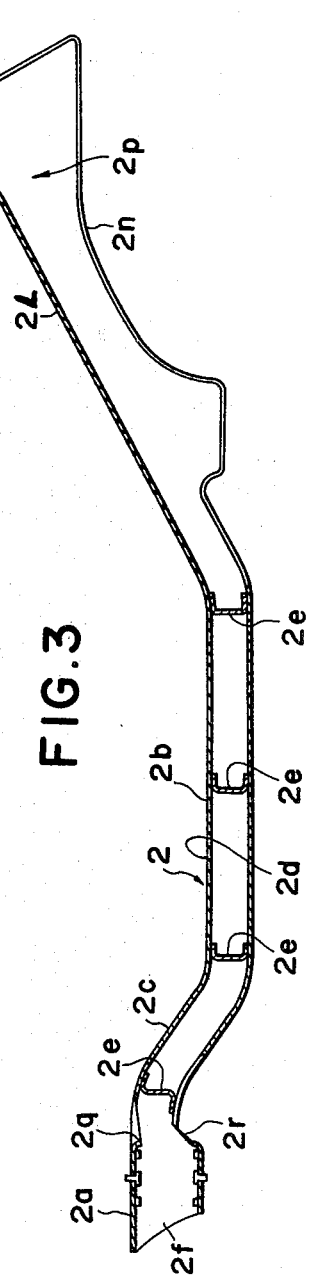

MOTOR VEHICLE

This is a continuation of application Ser. No. 84,175 filed Oct. 12, 1979 and now abandoned.

BACKGROUND OF THE INVENTION

The present invention relates to a novel motor vehicle construction, and more particularly to a small, light, and simplified motor vehicle, in which the suspension of at least two rear wheels and the arrangement of an engine are improved.

There is herein incorporated by reference the disclosure of commonly-assigned copending U.S. patent application Ser. No. 83,627 now abandoned of the present applicants entitled "MOTOR VEHICLE" filed Oct. 11, 1979 and commonly-assigned copending U.S. patent application Ser. No. 83,628 of the present applicants entitled "FRONT WHEEL SUSPENSION MECHANISM FOR VEHICLES" filed Oct. 11, 1979 and now U.S. Pat. No. 4,288,096, both of which applications claim Convention priority from Japanese Patent Application 125947/78.

SUMMARY OF THE INVENTION

The present invention provides a motor vehicle wherein two leaf springs are extended rearwardly from both sides of a vehicle frame below the seat of a driver so that they may support the rear axles of the vehicle at the rear free ends of the leaf springs.

According to the present invention, the two rear wheels are supported by means of two respective leaf springs of the type similar to trailing arms, and the members for suspending the two rear wheels simultaneously act as shock absorbers having elasticity. Because the two rear wheels are supported on the free ends of the leaf springs, the motor vehicle according to the present invention is provided with excellent shock absorbing effects. Further, the two rear wheels are suspended upon a small and light frame employing a minimum number of parts such that the functions of a rear suspension mechanism can be sufficiently and effectively attained.

In accordance with the present invention, because the two leaf springs are extended rearwardly at both sides of the vehicle frame, the length of the frame can be reduced considerably, and a sufficient wheel base can be ensured between the rear and front wheels, while at the same time sufficiently reducing the width of the frame. In addition, a sufficient tread can also be ensured between the two rear wheels so that the stability and riding quality of the small and simplified vehicle having the two rear wheels can be accordingly ensured.

Another object of the present invention is to provide a motor vehicle wherein an engine is disposed between the leaf springs and in the space defined under the vehicle frame below the driver's seat without reducing the size of the vehicle, so that the arrangement of the engine may be advantageous with respect to space utility, and so that installation and support of the engine may be practical and reliable.

A further object of the present invention is to provide a motor vehicle wherein both the support of the engine upon the frame and the support of the rear axles by means of the leaf springs are accomplished elastically by means of rubber elements or the like. Further, the center of gravity of the engine is located in the front portion thereof so that the mounting of the engine upon the vehicle frame may be made at a longitudinal center of the leaf springs. The engine is disposed on the axles of the rear wheels and substantially at a vertical and transverse center of the space between the rear wheels, to thereby ensure reliable support of the engine or heavy clock and to lower the center of gravity of the vehicle so that the steering stability of the vehicle during cornering operations may be improved, while simplifying the engine support.

A further object of the present invention is to provide a motor vehicle, wherein the vehicle frame has the rear portion thereof formed of a pressed molding which is opened downwardly to form a channel. Further, the rear portion of the frame has both sides thereof bent sideways to form flanges for mounting the base portions of the right and left leaf springs thereto. The engine is arranged in the space defined by such inverted channel, whereby the space utility of the vehicle is highly advantageous, and whereby the protection and cooling capacity of the engine as well as the rigidity and strength of the frame can be improved to desirable levels.

Other objects and advantages of the present invention will become apparent from the following description, with reference to the accompanying drawings.

BRIEF DESCRIPTION OF THE DRAWINGS

FIG. 1 is a side elevation diagrammatically illustrating a vehicle according to the present invention.

FIG. 2 is a top plan view showing the vehicle.

FIG. 3 is an enlarged longitudinal section showing the frame of the vehicle.

DETAILED DESCRIPTION OF PREFERRED EMBODIMENTS

Figure 4:
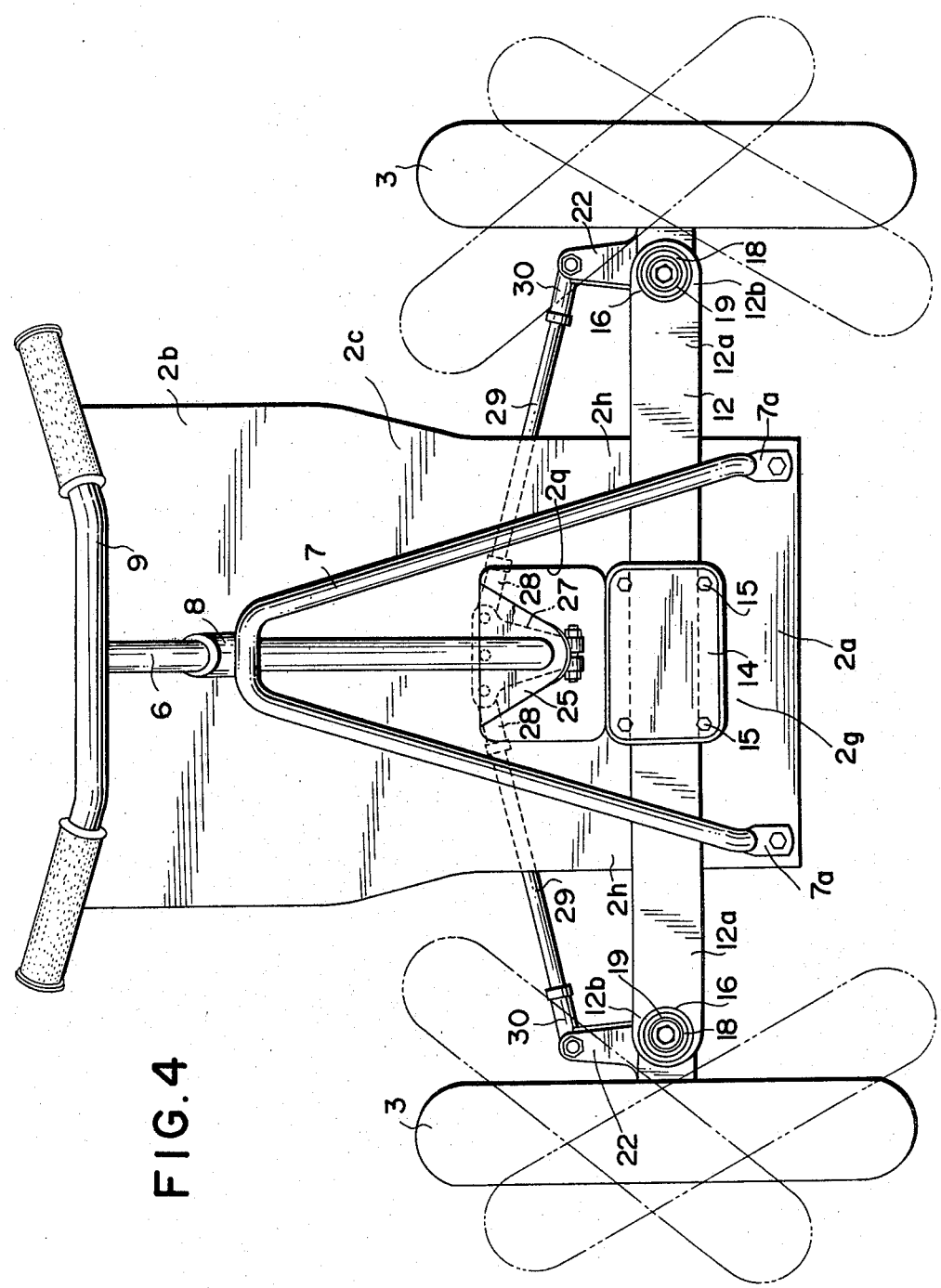
FIG. 4 is an enlarged top plan view showing a front portion of the vehicle.

FIGS. 1 and 2 comprise, respectively, a side elevation and a top plan view showing the basic construction of a vehicle according to the present invention.

With reference to FIGS. 1 and 2, a frame 2 extends longitudinally of the vehicle 1. The frame 2 is equipped at the front sides thereof with a pair of front wheels 3, 3, which function as steering wheels, and at the rear sides thereof with a pair of rear wheels 4, 4 which function as drive wheels for the vehicle. In other words, the vehicle according to the present embodiment of the invention comprises a four-wheel vehicle having two front and two rear wheels. The frame 2 is further provided at the center or rear portion thereof, i.e., at substantially a central portion in the longitudinal direction, with a seat 5 which provides a seat for a driver of the vehicle. The seat 5 has a width which is substantially equal to that of frame 2. At a front portion and at a widthwise (or transverse) center portion of frame 2 there is provided a steering shaft 6 which extends rearwardly at an inclination. The shaft 6 is mounted on the upper end of an inverted V-shaped stay 7, which in turn has the lower ends thereof 7a, 7a fixed to both sides of the frame front end, and is rotatably fitted in a supporting member 8. To the upper end of shaft 6 is fixed a steering bar 9 which constitutes the handle of the vehicle for performing steering operations. The frame 2 is formed at its intermediate portions between the steering shaft 6 and the seat 5 with a floor 2d which has substantially the same width as that of the seat 5, and provides support for the feet of the driver.

Figure 6:
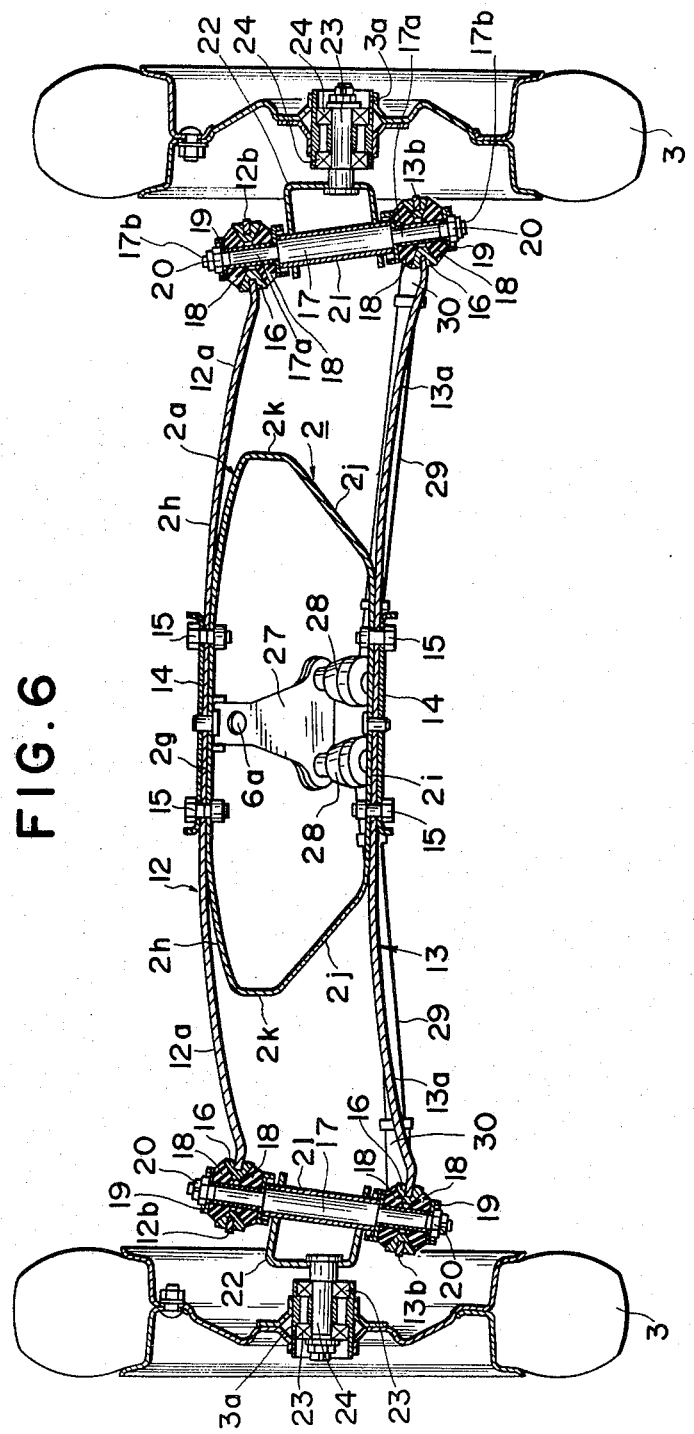
FIG. 6 is an enlarged transverse section showing the front suspension of the vehicle.

The overall construction of frame 2 is shown in FIGS. 3 and 6. The frame 2 is made of a steel plate which is press-molded into a configuration having a box-shaped cross-section, as shown in FIG. 6, and includes a horizontal front portion 2a, a horizontal intermediate portion 2b, and a sloped connecting portion 2c extending therebetween. A plurality of cross members 2e are mounted in frame 2 at longitudinally-spaced intervals, to thereby improve the rigidity and strength of frame 2. The front end of frame 2 is opened at 2f.

The front portion 2a of frame 2 is formed one step higher, as shown in FIG. 3, than the intermediate portion 2b. The cross-sectional shape of the front portion 2a is such that, as shown in FIG. 6, an upper portion 2g thereof has its upper side portions 2h, 2h slightly curved downwardly, such that the center portion is the highest, and flat. The front portion 2a has a flat lower portion 2i positioned at the lowest level, and both lower side portions 2j, 2j of front portion 2a are inclined upwardly such that inclined portions 2j, 2j merge into the warped portions 2h, 2h at side walls 2k, 2k.

Figure 8:
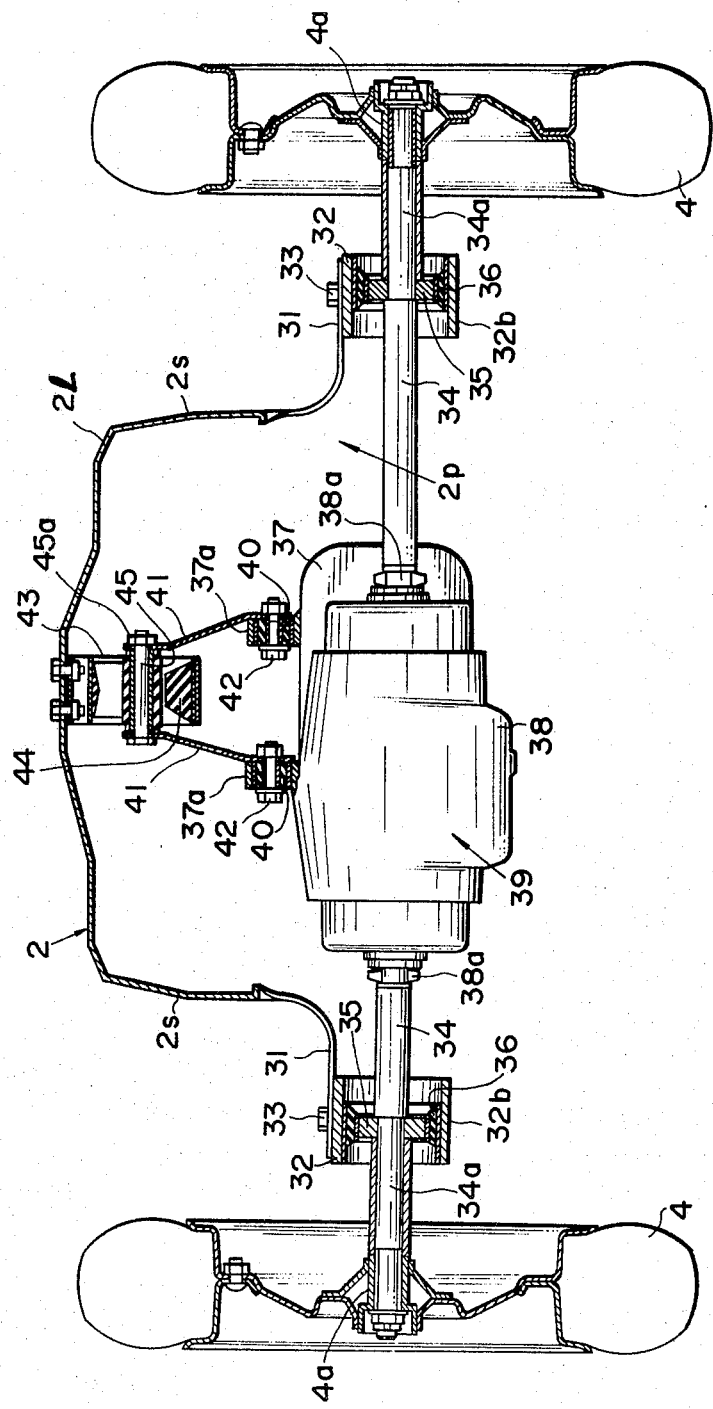
FIG. 8 is a section taken along line 8—8 of FIG. 7.

The rear portion 2L of frame 2 extends rearwardly and upwardly from the rear end of the intermediate portion 2b, at an inclination. The rear portion 2L has its lower and rear end opened at 2m and 2n. As a result, the rear portion 2L is opened downwardly to form a space 2p therein, as shown in FIG. 8.

At both sides of the sloped rear portion 2L of frame 2 is arranged a pair of generally L-shaped stays 10, 10 (FIG. 7), each of which has a horizontal portion 10a connected at its rear end to the upper portion of rear portion 2L, and a bent depending portion 10b connected to the sloped portion of rear portion 2L. The seat 5 is mounted on stays 10, 10 in a transverse manner. A fuel tank 11 is mounted between stays 10, 10 and below seat 5. The fuel tank 11 has a cap 11a disposed at the back of seat 5 and threadedly fastened on the inlet of tank 11.

With reference to FIGS. 4 and 6, a widthwise extending leaf spring 12 is mounted on the front portion 2a of frame 2 between the lower ends of steering shaft 6 and stay 7. Another leaf spring 13 is mounted on the lower side of the front portion 2a in parallel with spring 12. Thus, the upper and lower parallel leaf springs 12 and 13 are arranged in vertically spaced relation, with the front portion 2a of frame 2 being sandwiched therebetween. Leaf springs 12 and 13 have their longitudinal end portions 12a and 13a extending from the right and left sides of frame 2. The leaf springs 12 and 13 are connected to the outsides of the upper and lower portions 2g and 2i of the front portion 2a, i.e., the spring 12 is connected to the upper side and the spring 13 to the lower side, through holder plates 14, 14 by means of bolts and nuts 15.

The leaf springs 12 and 13 have both end portions 12a and 13a thereof provided with mount portions 12b and 13b which are spaced vertically and on which collars 16, 16 are fitted. A king pin 17 is inserted into the upper and lower collars 16, 16. Between the upper and lower end portions 17a, 17a of pin 17 and the upper and lower sides of collars 16 is mounted a pair of bush-shaped rubber mounts 18, 18 which have both axial ends thereof formed into a frustoconical shape. A washer 19 is attached to the outer end face of rubber mount 18, and a nut 20 is mounted on the axially upper and lower end portions of pin 17 and is fastened to the threaded portions 17b, 17b. As a result, the mounts 18, 18 are compressed in the axial direction of king pins 17 so that pins 17 are connected to the mount portions 12b and 13b of the upper and lower leaf springs 12 and 13.

Mounted on each of the king pins 17 is a bush 21 which is connected to a knuckle 22. The knuckle 22 is fixed a front axle 23 which in turn supports the hub 3a of each of the front wheels 3, 3 through a bearing 24.

As described hereinabove, the front wheels 3, 3 are mounted sideways of the frame front portion 2a and are supported on both end portions of the upper and lower leaf springs 12 and 13 through elastic members 18, 18. The leaf springs 12 and 13 act as suspension members for the right and left front wheels 3, 3 and have an elastic warping action so as to function as a shock absorber. For the reactions to be imparted from the road to the front wheels 3, 3, therefore, both of the end portions 12a and 13a of the upper and lower leaf springs 12 and 13 extending sideways from frame 2 can elastically move up and down in parallel with each other to thereby perform shock absorbing actions in response to the motions of wheels 3, 3. The substantial upward warp of the ends of lower leaf spring 13 is regulated by the sloped portions 2j, whereas the downward warp of the ends of upper leaf spring 12 is regulated by the curved portions 2h. More specifically, the warping motions resulting from the vertical shock absorbing actions of leaf springs 12 and 13 are regulated by both sides of the front portion 2a of frame 2 so that excessive deformation of leaf springs 12 and 13 can be prevented because both side portions 2h and 2j act as stoppers.

Because the king pins 17 are connected to leaf springs 12 and 13 through elastic members 18, the fine vibrations of the front wheels resulting from road roughness can be effectively absorbed and attenuated by the actions of elastic members 18, whereby the transmission of the vibrations to frame 2 is restricted and reduced, to improve riding quality. Further, the elastic members 18 are paired at the ends of king pins 17 and are axially forced, while interposing the collars 16 therebetween, by fastening the nuts 20. As a result, the elasticity of elastic members 18 can be varied by adjusting the fastening forces of nuts 20 so that the preferred attenuation can be easily preset merely by adjusting the fastening forces.

A given camber of front wheels 3, 3 is maintained because king pins 17 are supported at their upper and lower ends. More specifically, the camber is returned to its normal angle, even if it changes, by the actions of elastic members 18. The change in the camber is also absorbed through the deformation of elastic members 18 so that the camber can be maintained at a normal level.

Figure 5:
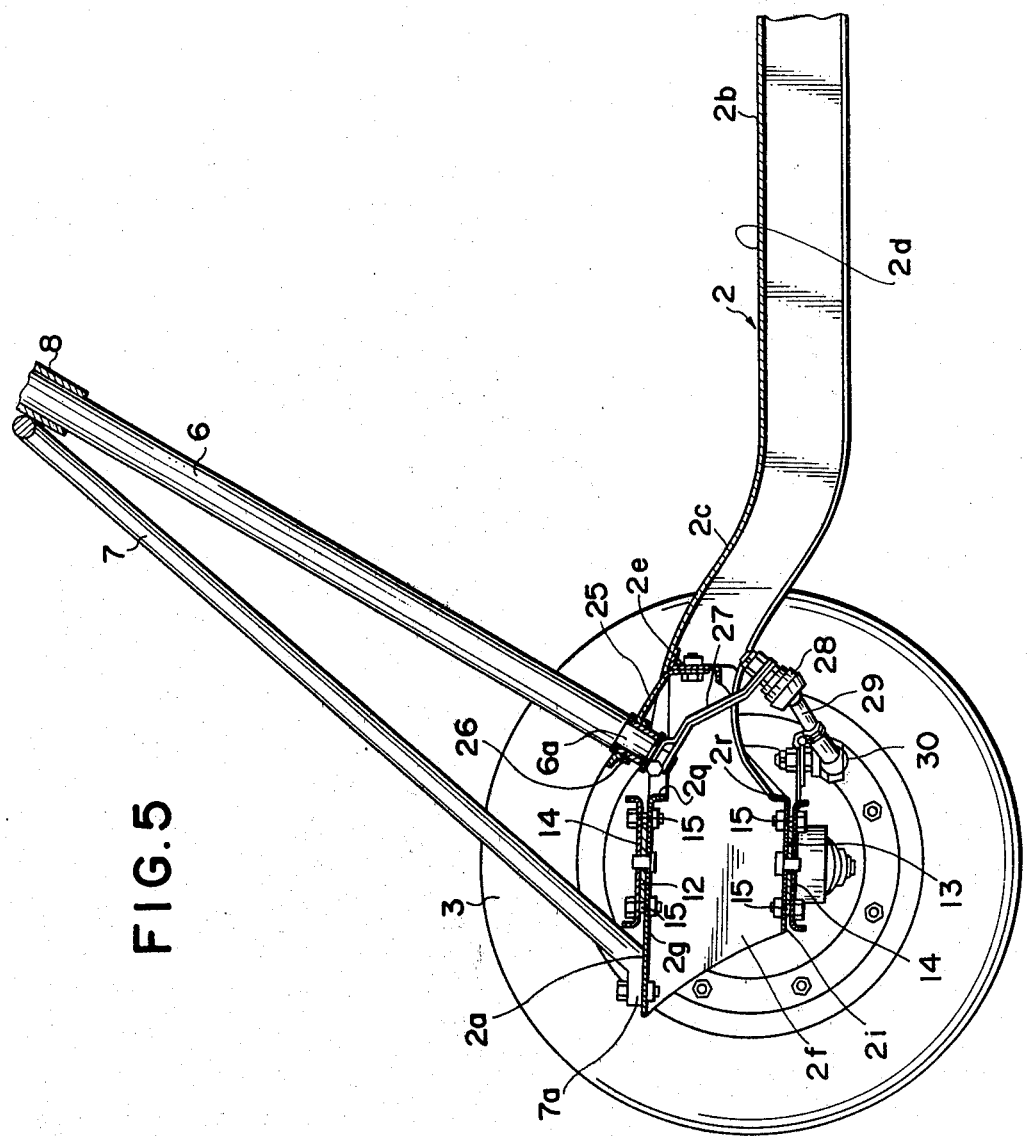
FIG. 5 is an enlarged longitudinal section of a portion of FIG. 4.

The upper and lower portions 2g and 2i of the frame front portion 2a are formed with through-openings 2q and 2r at the back of leaf springs 12 and 13. As shown in FIGS. 4 and 5, a bracket 25 extending forwardly and upwardly at an inclination is mounted to the cross member 2e facing the opening 2q. This bracket 25 supports the lower end 6a of steering shaft 6 in a rotatable manner through a collar 26. The lower extension of shaft lower end 6a is connected an arm 27 which extends through the frame front portion 2a such that its lower end portion protrudes from the lower opening 2r. A pair of tie rods 29, 29 are connected at first ends thereof to the lower end portions of arms 27 through joints 28. The second ends of tie rods 2g are connected to knuckles 22 through joints 30, 30. The two joints 28 and 30 act as universal joints to allow tie rods 29, 29 to follow the vertical movements of knuckles 22, which in turn follow the motions of the end portions of leaf springs 12 and 13 resulting from the motions of front wheels 3, 3. The arms 27 are almost housed in the front portions 2a of frame 2, whereas the tie rods 29 and joints 30 are disposed at the back of leaf spring 13. As a result, the steering mechanism thus described has the front portion thereof protected because the leaf springs and other members are arranged in front of same.

The above described suspension system of the front wheels can also be applied to a vehicle having a single rear wheel.

The arrangement of the suspension system for the rear wheels and the engine of vehicle 1 according to the present invention will be described hereinbelow. As apparent from the drawings, in the present embodiment, the vehicle 1 is provided with four wheels, i.e., two front wheels and two rear wheels.

Figure 7:
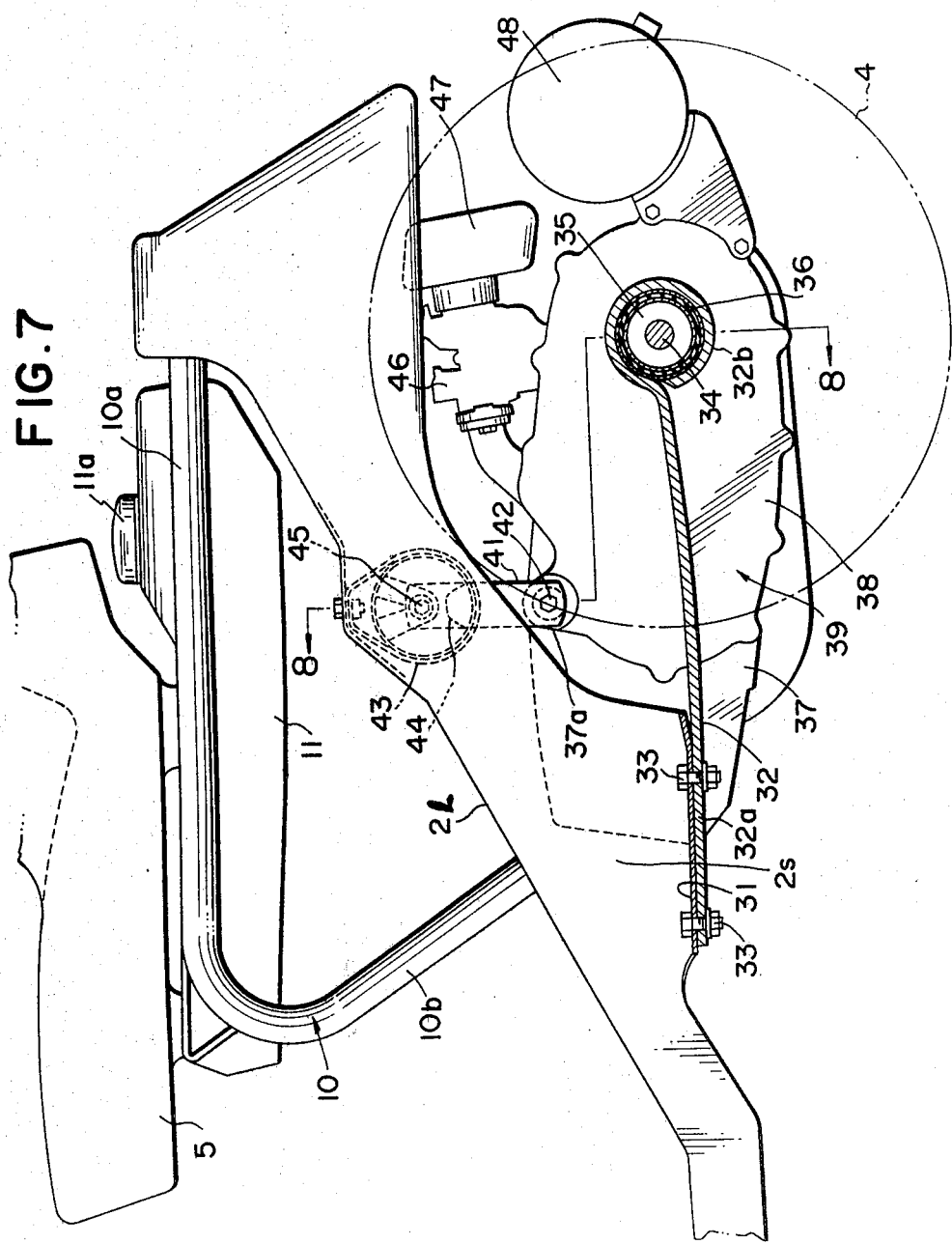
FIG. 7 is an enlarged side elevation of a rear portion of the vehicle, showing an essential portion thereof in section.

With reference to FIGS. 7 and 8, a pair of flanges or mount portions 31, 31 are formed at the lower portion of the rear portion 2L of frame 2 and at the lower ends of both side walls 2s, 2s thereof below seat 5. The flanges 31, 31 are press-molded integrally with frame 2 such that they extend horizontally outwardly from the lower ends of walls 2s, 2s, on both sides of seat 5. A pair of leaf springs 32, 32 are connected at their base or proximal ends 32a, 32a to the flanges 31, 31 by means of bolts and nuts 33.

As shown in FIGS. 7 and 8, leaf springs 32, 32 comprise very narrow plates which extend rearwardly, and have their proximal ends 32a connected to both lower sides of seat 5 at frame 2 through flanges 31. The right and left leaf springs 32, 32 are spaced in the widthwise direction of frame 2 and extended rearwardly in parallel, and have a length which just fails to reach the rear end of frame 2. Each of the leaf springs 32 has its rear end formed into a free end, which is wound into a loop shape to form a rear axle bearing portion 32b. Thus, the transverse extension of leaf springs 32, 32 can be restricted to such an extent as to slightly protrude from both sides of frame 2.

A rear axle 34 acting as a drive shaft is mounted transversely between bearing portions 32b, 32b of leaf springs 32. The rear axle 34 has both end portions 34a, 34a thereof extended through the bearing portions 32b, 32b, such that they protrude to the outsides thereof so as to carry the hubs 4a of rear wheels 4, 4. More specifically, the extending ends of leaf springs 32, 32 support the rear wheels so that leaf springs 32, 32 constitute the suspension members for rear wheels 4, 4. As a result, leaf springs 32 have their proximal ends 32a connected to frame 2 and their rear axle bearing ends 32b formed into the free ends so that wheels 4, 4 can elastically move up and down. Thus, leaf springs 32 provide a suspension system which is similar to a trailing arm.

In addition, the support of rear axle 34 by bearing portions 32b of leaf springs 32 is provided by mounting a bush-shaped rubber mount 36 between the inner periphery of each of the bearing portions 32b and the outer circumference of a bearing bush 34 which is fitted on the corresponding circumferential portion of rear axle 34. As a result, the right and left rear wheels 4, 4 are elastically suspended by leaf springs 32 relative to the vehicle body and by the rubber mounts 36 relative to leaf springs 32 themselves. Thus, the shock absorbing effects upon the rear wheels can be enhanced, and the compliance of the right and left rear wheels during cornering operations can be effectively improved by the action of the rubber mounts. Because the leaf springs 32, 32 act as cantilever supports for rear wheels 4, 4, in addition to the effects of the above described trailing arm, it is possible to make the length of leaf springs 32 as short as possible while extending rearwardly and to have a large swinging stroke in the vertical direction while leaf springs 32 themselves are shortened. As a result, the wheel base of the vehicle can be accordingly shortened in relation to front wheels 3.

Figure 9:
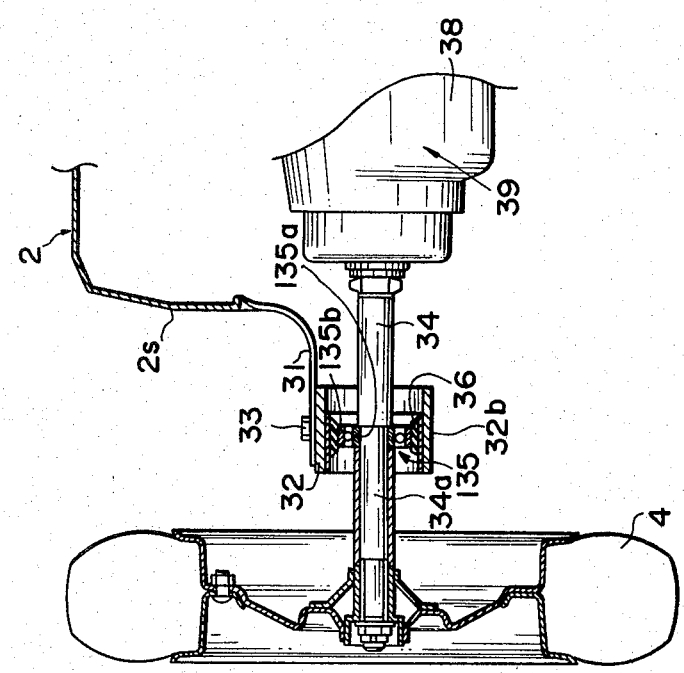
FIG. 9 is similar to FIG. 8, but shows a modification of the rear axle supporting portion of FIG. 8.

As shown in FIG. 9, the support of axles 34 by the bearing portions 32b, 32b is carried out by mounting a ball bearing 135 upon the outer circumference of each of the axles 34 to support the axle at the inner race 135a thereof and by jointing the outer race 135b to the inner circumference of a rubber mount 36. As a result, the rotations of the axles can be further smoothened.

The engine of vehicle 1 has a power unit 39 which is formed integrally of an engine body 37 and a transmission case 38. The engine unit 39 is arranged, as shown in FIG. 8, between the right and left leaf springs 32, 32 below the rear portion 2L of frame 2 and in a position to face the space 2p opened at 2m and 2n. Above the engine 37, there are arranged a pair of brackets 37a, 37a which are spaced from each other in the widthwise direction and which are connected to and supported by a pair of suspension plates 41, 41 through rubber mounts 40 by means of bolts and nuts 42, to thus define two elastic support positions for the engine.

From the lower side of the rear portion 2L of frame 2 there depends an engine mounting member in the form of a bracket 43, to the center of which a mount pin 45 is transversely mounted through a rubber mount 44. The pin 45 has both ends thereof connected to the upper ends of suspension plates 41, 41, and together with rubber mount 44 defines a third elastic support portion for the engine. In the embodiment shown, pin 45 comprises a bolt, to which a nut 45a is fastened to connect plates 41, 41.

With reference to FIG. 7, there is shown a carburetor 46, an air cleaner case 47, and a muffler 48.

The engine unit 39 is mounted in the downwardly opened space 2p of rear portion 2L of frame 2 and is suspended by the rubber mounts from frame 2. Because the rubber mounts are disposed at three points, i.e., at the two points 40, 40 at the side of engine unit 39, and the point 44 at the side of frame 2 the engine unit 39 can smoothly follow the longitudinal, transverse and vertical motions of rear wheels 4, 4 so as to elastically support and protect the engine. The vibrations of rear wheels 4, 4 and the engine 37 can be effectively attenuated through the rubber mounts, which ensures excellent vibration-preventing effects.

In addition, the mounting portion of engine unit 39 is disposed at a widthwise center between rear wheels 4, 4, and the engine body 37 which has the center of gravity of unit 39 is disposed substantially at the center in the longitudinal direction of leaf springs 32, as shown in FIGS. 7 and 8. As a result, a heavy power unit can be effectively mounted, with improved space utility and while ensuring a desirable layout with respect to rigidity. Because the unit 39 is arranged at the center between rear wheels 4, 4, the transverse balance at the rear of the vehicle can be improved to a satisfactory level, even for inertia occurring during cornering operations of the vehicle.

The engine unit 39 is connected to the rear axles 34. More specifically, the rear axle 34 is axially divided, as shown in FIG. 8, into two halves 34, 34, which have their inner ends connected in alignment to output shaft portions 38a, 38a extending from opposite sides of transmission case 38 at the rear of unit 39 to constitute a power unit integrated with the rear axles. The inner ends of rear axle haves 34, 34 are thus rigidly supported by transmission case 38 such that the axes thereof are incapable of being displaced relative to each other. Thus, unit 39 is arranged on the axis of rear axles 34, 34 at the vertical and transverse center of a space between the rear wheels. As a result, engine unit 39 is disposed at a low position in the vehicle, to thereby lower the center of gravity of the vehicle, and to eliminate the drawback caused by inertia during cornering operations when the driver is sitting on seat 5, thus remarkably improving stability. Because the unit is connected in alignment to the rear axles, space utility is improved, and the construction is so remarkably simplified as to eliminate the need for a complicated transmission drive system.

As described hereinabove, the power unit 39 is arranged in the downwardly opened space 2p of the frame rear portion 2L in accordance with the above described layout to thereby improve space utility and stability and to simplify the transmission drive system so that the engine mount can be effectively accomplished with the use of a minimum number of parts.

In the illustrated embodiment, because the rear portion 2L is opened at the lower side thereof and is inclined, the air flow having passed below the intermediate portion 2b of frame 2 is guided by the slope of rear portion 2L to pass around engine 37 so that engine 37 is forcibly and efficiently cooled down.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A motor vehicle, comprising:
a vehicle frame;
a seat for a driver of said vehicle;
rear wheels, and axles therefor;
two leaf springs extending rearwardly from both sides of said vehicle frame, below said seat, such that said leaf springs support said axles of said rear wheels at the rear ends of said leaf springs;
each of said leaf springs being formed at the rear end thereof with a bearing portion for mounting said axles;
an elastic member being sandwiched between said bearing portion and the bearing of each rear axle such that said axles are mounted elastically on said rear ends of said leaf springs;
a power unit including an engine and a transmission case disposed between said leaf springs, in a space defined under said frame below said seat;
an engine mounting member depending downwardly from a portion of said frame disposed above said engine;
a pair of transversely spaced suspension members connected to said engine so as to extend upwardly therefrom, said suspension members being in turn connected to said engine mounting member;
said suspension members being elastically connected to said engine at transversely spaced portions thereof to define two elastic support portions for said engine, and being elastically connected to said engine mounting member to define a third elastic support portion for said engine; and
said axles of said rear wheels having the inner ends thereof rigidly supported by, and extending from opposite sides of, said transmission case such that the axes of said axles are incapable of displacement relative to each other.

2. A motor vehicle according to claim 1, wherein:
said engine mounting member comprises a bracket depending downwardly from said frame portion and having a pin transversely mounted thereon;
a rubber mount is disposed around said pin; and
said suspension members are connected at the upper ends thereof to respective ends of said pin to define, together with said rubber mount, said third elastic support portion for said engine.

3. A motor vehicle according to claim 1, wherein:
said bearing of said rear axle includes a bush or a bearing having inner and outer races which are movable relative to each other; and
said elastic member comprises a rubber mount.

4. A motor vehicle according to claim 1, wherein:
the center of gravity of said engine of said vehicle is disposed forwardly of said rear ends of said leaf springs; and
said engine is mounted on said vehicle frame at a position between substantially the longitudinally-central portions of said leaf springs.

5. A motor vehicle according to claim 1, wherein:
said power unit is disposed on the axles of said rear wheels and substantially at a vertical and transverse center of the space between said rear wheels.

6. A motor vehicle according to claim 1, wherein:
the portion of said frame for supporting said seat is opened downwardly to form a substantially channel-shaped cross-section with said space defined therein; and
said portion of said frame has both sides thereof provided with a bent portion forming the mount portions for said leaf springs.

7. A motor vehicle according to claim 1, wherein:
said engine is integrated with said transmission case to form said power unit; and
said rear axles comprise axial half portions which are connected coaxially to the respective outputs of said transmission case.

* * * * *